United States Patent [19]

Hoglund

[11] Patent Number: 4,524,751

[45] Date of Patent: Jun. 25, 1985

[54] PORTABLE COOKING DEVICE

[76] Inventor: Allen C. Hoglund, 116-261, 3rd St. East, North Vancouver, B.C., Canada

[21] Appl. No.: 409,876

[22] Filed: Aug. 20, 1982

[51] Int. Cl.³ ............................................. A47J 37/00
[52] U.S. Cl. .................. 126/25 A; 126/9 R; 126/9 B; 126/41 R; 99/339; 16/114 R; 219/279; 219/386
[58] Field of Search ...................... 126/9 R, 9 B, 25 R, 126/25 A, 41 R, 275 R, 275 E, 38; 99/449, 450, 339; 219/279, 385, 386, 454, 472; 294/9, 10, 12; 16/110 A, 114 R, 114 A, 124, 111 R, DIG. 24, DIG. 40

[56] References Cited

U.S. PATENT DOCUMENTS

| | | | |
|---|---|---|---|
| 1,879,880 | 9/1932 | Lindsey | 126/9 R |
| 2,988,082 | 6/1961 | Kuhn | 126/9 R |
| 3,306,279 | 2/1967 | Dale | 126/25 A |
| 3,503,324 | 3/1970 | Gmeiner | 126/9 R X |
| 3,611,912 | 10/1971 | Choc | 126/9 R X |
| 3,692,013 | 9/1972 | Grafton et al. | 126/41 R |
| 3,802,413 | 4/1974 | Pepin | 126/25 A |
| 3,848,110 | 11/1974 | Giguere et al. | 219/386 X |
| 4,133,335 | 1/1979 | Malafouris | 126/9 R |
| 4,211,206 | 7/1980 | Darbo | 126/9 R |

FOREIGN PATENT DOCUMENTS 973440  8/1975  Canada .................................. 126/38

Primary Examiner—Margaret A. Focarino

[57] ABSTRACT

A portable camp stove comprising a housing having two concave sections each having an open end and hinged to one another for juxtaposition with their open ends facing one another. One of the concave sections has a heat generating element secured therein beneath a heat transmitting support frame. The other of the concave sections has a collapsible wall assembly secured thereto and positionable to an operable vertical position extending above the open end thereof. A combustible product support platform is securable internally of the wall assembly, when in the operable vertical position, to support a combustible product thereon at a desired height. The wall assembly has at least one angulated reflective wall. A reflective base wall is also provided under the support platform for collecting ashes and radiating heat upwardly.

39 Claims, 8 Drawing Figures

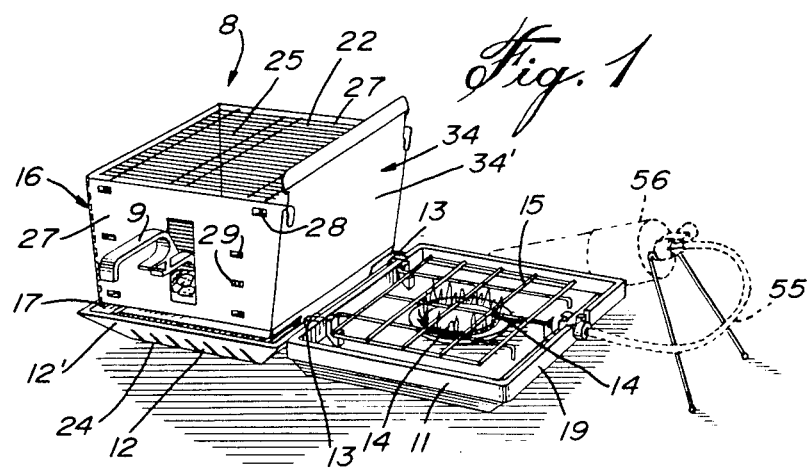
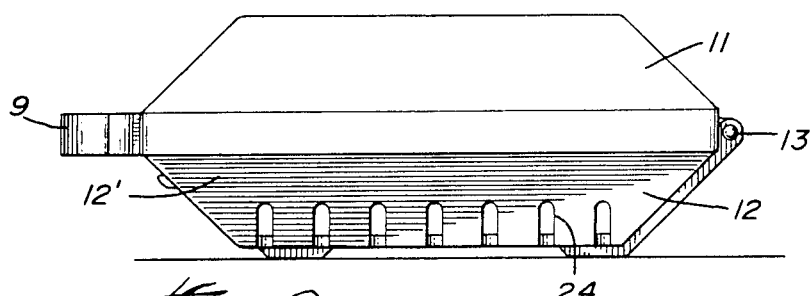
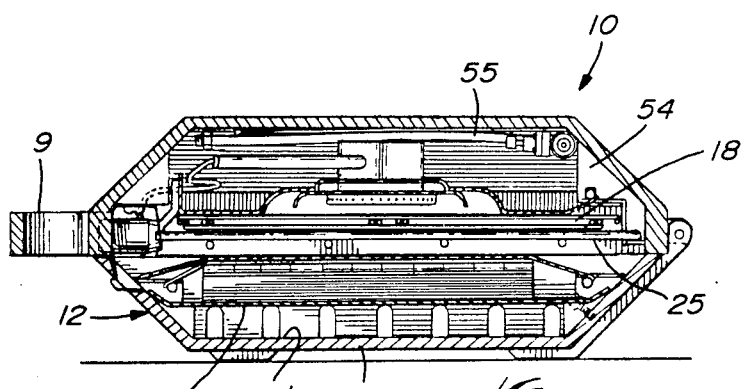

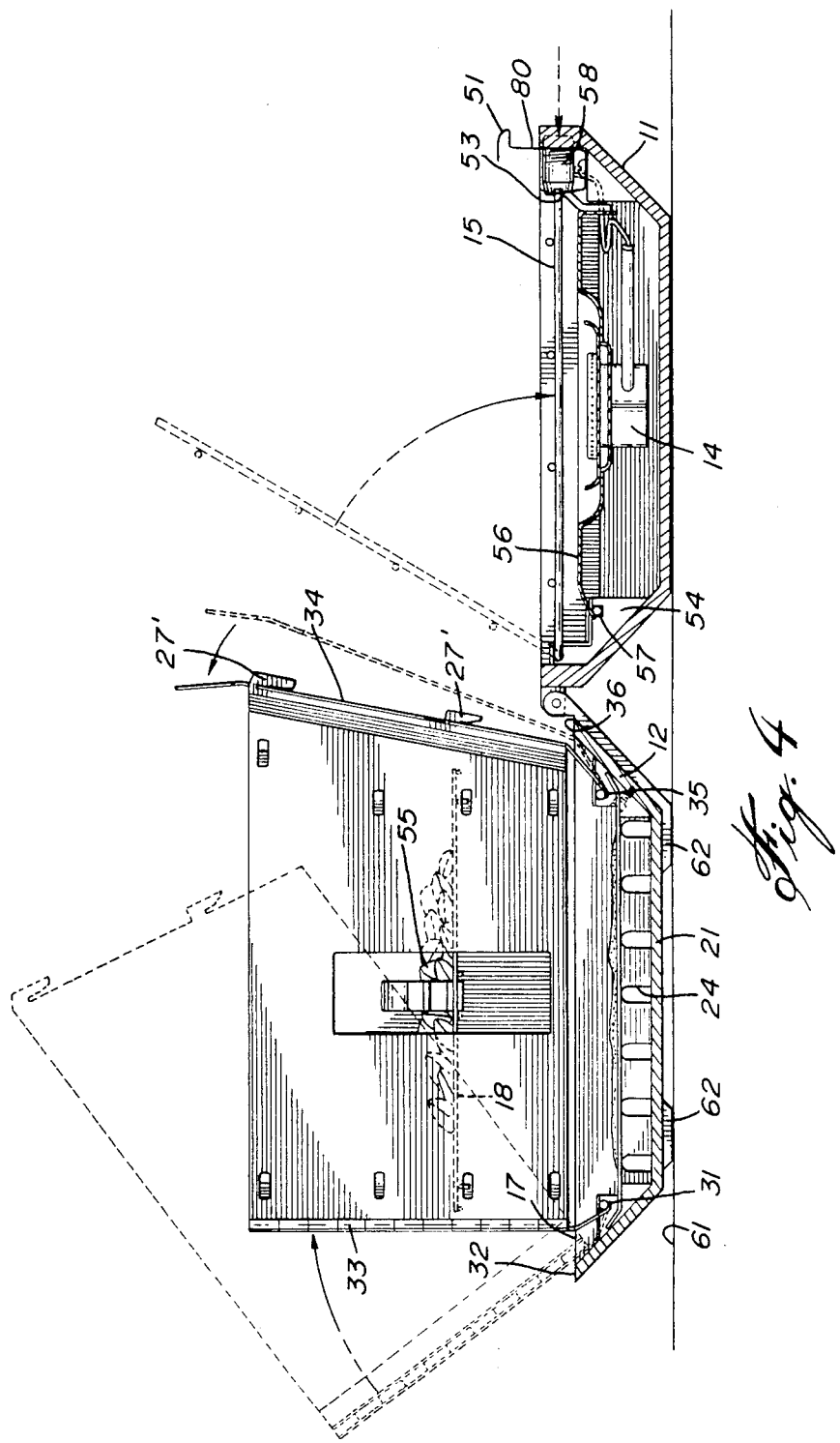

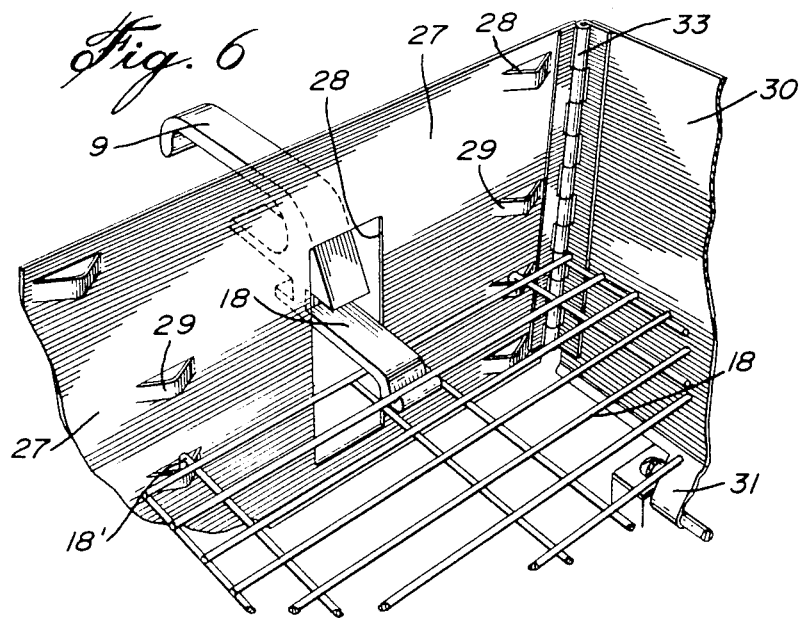
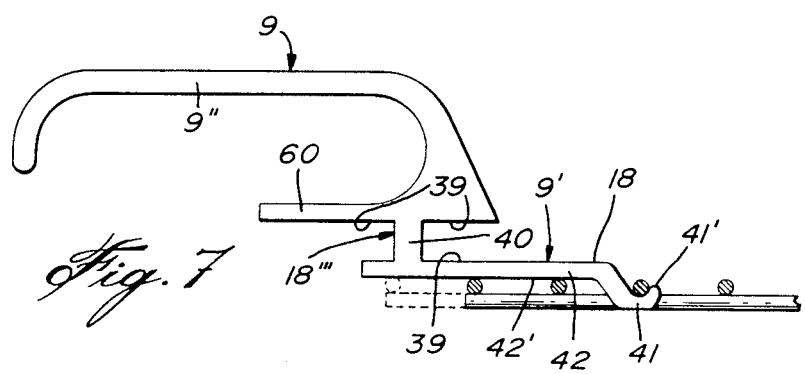
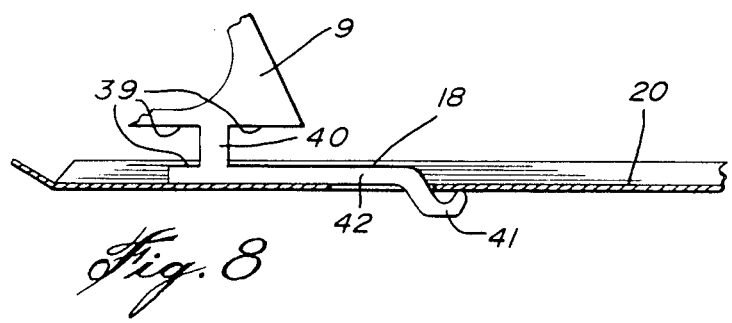

4,524,751

PORTABLE COOKING DEVICE

BACKGROUND OF THE INVENTION (a) Field of Invention

The present invention relates to a portable cooking device having a cover and a base section hinged together with a heating element provided in the cover and wherein a collapsible wall assembly is provided in the base so that when the cover and base are disposed side-by-side both the cover and base are convertible to cooking sections, and when not in use the vertical walls are collapsed into the base and the cover and base are secured in juxtaposition to constitute a carrying case for the cooking device.

(b) Various types of portable cooking devices, such as camp stoves or barbecues have been provided. However, to date, these have been found to be very bulky and heavy to carry, not versatile, some unsafe to operate and provide only one type of heat generating means, i.e., either a gas burner, electric heater, charcoal or a combustible product. The portable type stoves, heretofore known, are quite bulky in design, and difficult to store. Furthermore, the construction of portable type camp stoves have been found inefficient as they provide exceessive heat loss in the cooking area.

SUMMARY OF INVENTION

It is a feature of the present invention to provide an improved portable cooking device which substantially overcomes all of the above-mentioned disadvantages.

Another feature of the present invention is to provide a portable cooking device having a cover and a base which are hinged together for juxtaposition to convert into a carrying case and wherein a gas burner is provided in the cover and a barbecue assembly is disposable over the base when both the base and cover are in their open side-by-side position of use.

Another feature of the present invention is to provide a portable cooking device having a cover and a base which are securable in juxtaposition and have different cooking elements provided in both the base and cover and storable therein when the cover and base are secured juxtaposed to form a carrying case.

Another feature of the present invention is to provide a portable cooking device having a base and a cover wherein a barbecue is provided in the base and comprises a collapsible wall assembly which is securable in a vertical position to form a flue and has at least one inclined wall to reflect heat in the direction of an open top end of the flue.

According to the above features, from a broad aspect, the present invention provides a portable cooking device comprising a housing have two concave sections each having an open end and securable to one another in juxtaposition with their open ends facing one another. One of the concave sections has a heat generating element secured therein beneath a heat transmitting support frame. The other of the concave sections has a collapsible wall assembly secured thereto and positionable to an operable vertical position extending above the open end of the other concave section. A combustible product support platform is securable internally of the wall assembly when in the operable vertical position to support a combustible product thereon. The wall assembly has at least one angulated reflective wall. A base wall is provided under the support platform to collect ashes and to reflect heat upwardly.

BRIEF DESCRIPTION OF DRAWINGS

A preferred embodiment of the present invention will now be described with reference to the example thereof illustrated in the accompanying drawings in which:

FIG. 1 is a perspective view of the portable cooking device when in use;

FIG. 2 is a side view of the portable cooking device in its storage position, when not in use;

FIG. 3 is a cross-section view of FIG. 2 showing the various elements of the cooking device in their stored position;

FIG. 4 is an operational side view, partly in cross-section, showing the assembly of the portable cooking device;

FIG. 6 is a fragmented perspective view showing the combustible product support platform and its handle for the positioning of same;

FIG. 7 is a side view of the handle for the portable cooking device showing its use for adjusting the combustible product support platform; and FIG. 8 is a fragmented view of the handle showing its use in engaging the base wall.

DESCRIPTION OF PREFERRED EMBODIMENTS

Figure 5:
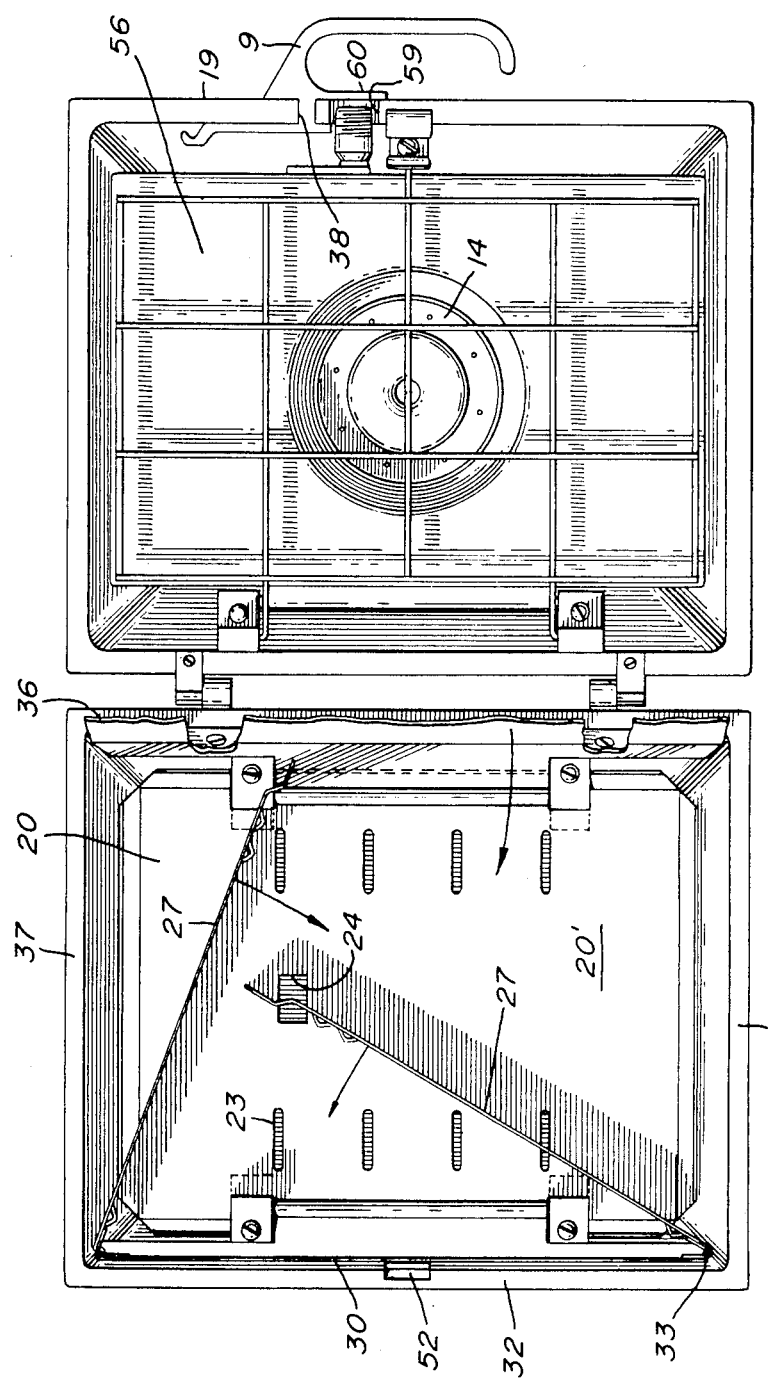
FIG. 5 is a plan view of the portable cooking device showing the mode of assembly of the collapsible wall assembly.

Referring now to the drawings, and more particularly to FIG. 1, there is shown generally at 8 the portable cooking device of the present invention. The device comprises a housing have two concave sections, a cover 11 and a base 12. The cover and base are of rectangular contour with inwardly sloping side walls and are hinged together by hinges 13 disposed between common side walls thereof. The cover is herein provided with a heat generating element, constituted by a gas burner 14 beneath a heat transmitting support wire frame 15. The base is provided with a collapsible wall assembly 16 which is secured thereto, in a manner which will be described later, and positionable to an operable vertical position extending above the open end 17 of the base to form a flue. A combustible product support platform 18 (see FIGS. 4 and 6) is adjustably securable internally of the wall assembly and adjustable to various heights therein, as will be described later. Thus, when in an operative position, with the cover and base lying side-by-side with their open ends facing upwardly, the cover constitutes a gas burner stove and the base constitutes a charcoal-type barbecue.

Referring now additionally to the other Figures, it can be seen that the portable cooking device is also provided with a carrying handle 9 which is removably securable in an outer marginal wall 19 of the cover for carrying the cooking device when in its non-use position as shown in FIG. 2. A base wall 20 is removably securable over the inner face 21' of the bottom wall 21 of the base and it is provided with a top heat reflective surface, herein chrome plated, to reflect heat upwardly in the flue towards the open end 22 of the wall assembly 16. The base wall 20 also collects hot ashes and is provided with small vent openings 23 whereby to provide air circulation therethrough from vent slots 24 in the end walls 12' of the base. If the cover and base are made from plastics material, the openings 23 may not be provided in the wall 20. Instead the vent slots 24 may be provided in the opposed end walls 12' above the base 20 to provide ventilation from above the base wall for better combustion of the combustible product 55.

As shown in FIG. 8 the base wall 20 is also provided with a handle engaging hole 24 whereby a frame engaging portion 9' of the handle 9 is engageable therewith to lift the base wall out of the base for disposal of ashes and for cleaning same.

As illustrated in FIG. 1 a foodstuff support grill 25 is engageable near the open end 22 of the wall assembly 16 for supporting foodstuff or cookware. The grill is a steel wire mesh having engageable hook ends (not shown) which are engageable in inwardly projecting support flanges 26 stamped in opposed side walls 27 of the wall assembly 16. A handle receiving vertical opening 28 is provided in one of the side walls 27 to permit passage therein of the frame engaging portion 9' of the handle 9 so that the handle can displace the combustible product support platform 18 to a selected one of a plurality of vertical positions. The support platforms 18 is also a steel wire mesh having hook ends 18' which are engageable in a respective one of a plurality of support flanges 29 whereby to position the support platform 18 at selected distances from the support grill 25 in the top open end of the wall assembly. Thus, by spacing the combustible product on the support platform 18 at different distances, the intensity of the heat generated thereby in the support grill area is varied.

The outside wall 30 of the wall assembly 16 is hinged at a bottom end 31 thereof slightly inwardly of the outer edge 32 of the base section 12. The side walls 27 are hinged to opposed vertical edges 33 of the outer wall 30 and are foldable onto an inner face of the outer wall 30, as shown in FIG. 5. These three walls are then foldable into the base section 12 over the base wall 20. The inner wall 34 is a reflective wall which is hinged at its bottom edge 35 (see FIG. 4) slightly inwardly of the inner edge 36 of the base 12. The opposed vertical edges 33 of the outer wall 30 terminate also short of the opposed end edges 37 of the base whereby there is created an air space all about the wall assembly 16 and the outer edges of the base 12 for air flow under said wall assembly to cause enough draft in the flue interior of the wall assembly for better combustion.

The heat reflective wall 34 is detachably connected to the free vertical edges of the side walls 27 by hook edge flanges 27' to retain the wall 34 sloping outwardly of the wall assembly whereby to reflect heat at an angle upwardly in the direction of the open end 22 of the wall assembly. The reflective wall 34 also has at least its inner face chrome coated. The outer face 34' may also be chrome plated and it is angulated downwardly at the burner 14 and when used outdoors reflects the sun's rays on cookingware positioned on the frame 15 to maintain foodstuff, etc., warm. When not in use this reflective wall is folded over the outer wall 30 and its upper surface lies generally horizontal and constitues a shelf for supporting various elements thereon when only the gas burner 14 is used for cooking.

As shown in FIGS. 5 to 8 the handle 9 is provided with a hand engageable portion 9'', a frame engaging portion 9' and a support section 18'', the latter for engagement with one of the concave sections, herein the cover 11 for carrying the cooking device. As herein shown a slot 38 is provided in the outer marginal wall 19 of the cover section for receiving the neck portion 40 of the handle support section 9''. It can be seen that at opposed sides of the neck portion there are provided parallel surfaces which are spaced apart such as to receive a top end portion of the outer marginal wall 19 of the cover section, and in snug fit therein. Thus, to engage the handle, the neck portion 40 is slid into the slot 38 as shown in FIG. 5 and the cover and base are engaged in their closed position.

The frame engaging portion 9' is also provided with a hook end 41 which is disposed downwardly of an arm section 42 for engaging an end wire of the combustible product support platform 18, as shown in FIG. 6, or else the base wall 20 as shown in FIG. 8. The end 41' of the hook end 41 is spaced downwardly of the lower face 42' of the arm 42 to accommodate the thickness of the base wall 20, as shown in FIG. 8.

As herein shown the cover 11 and the base 12 are secured in juxtaposition by a spring fastener 50 secured adjacent the outer end edge 39 of the cover section 11. The spring fastener is generally a U-shaped fastener having a base retention end 51 which is receivable in a fastening cavity 52 adjacent the outer edge 32 of the base section 12 when the base is juxtaposed with the cover. The other arm of the spring fastener 50 is provided with a support frame retention arm 53 which is spring-biased inwardly against the heat transmitting support frame 15 whereby to retain same in a substantially horizontal position over the gas burner 14.

When the portable cooking device 10 is in its storage position, as shown in FIGS. 2 and 3, the storage area 54 under the burner support wall 56 is utilized to retain therein a burner hose coupling 55 which is connected to a compressed propane gas container 56 (see FIG. 1) to feed gas to the burner 14. Other elements could be stored in this storage area 54 such as charcoal starter, utensils, etc. In the area intermediate the heat transmitting support frame 15 and the burner 14 there is retained captive the combustible product support platform 18 and the support grill 25. As previously described the collapsible wall assembly 16 is collapsed in the base section 12 over the base wall 20.

The cover section 11 and base section 12 may be constructed of metal or suitable plastics material. The base wall 20 also constitutes a heat barrier whereby the heat generated from the combustible product 55 will not affect the material of the base when molded from plastic material. The vent slots 24 also provide sufficient ventilation beneath the barbecue section of the cooking device to dissipate heat in this region.

Although not shown it is within the ambit of the present invention to provide other heat generating elements in the cover 11, other than the propane burner 14. For example, an electrical heating resistive element (not shown) could be secured to the support wall 56 instead of a gas burner. Also, two types of burners may be provided and selectively connected in the cover when it is desired to use an electrical heater or a gas heater. The electric heater support wall could be made smaller and also stored in the compartment 54. As shown in FIG. 4 the support wall 56 has a hinge connection 57 at an inner edge thereof to permit the burner to be pivoted outwardly for access to the storage area 54 thereunder. As also shown in FIG. 4 the line connector 58 for the propane burner is positioned in a cavity 59 extending in the outer wall edge 17 of the cover and is closed off by a gate portion 60 of the handle 18 when positioned in the slot 38 in the outer wall edge. The base section 12 is supported above a support surface 61 by means of leg 62 provided in the four corners of the bottom wall 21 thereof.

It is within the ambit of the present invention to cover any obvious modifications of the example of the preferred embodiment described herein, provided such modifications fall within the scope of the appended claims.

I claim:

1. A portable cooking device comprising a housing having two concave sections each having an open end and securable to one another in juxtaposition with their open ends facing one another, one of said concave sections having a heat generating element secured therein beneath a heat transmitting support frame, the other of said concave sections having a collapsible wall assembly secured thereto and positionable to an operable vertical position extending above said open end of said other concave section, a combustible product support platform securable internally of said wall assembly when in said operable vertical position to support a combustible product thereon, said wall assembly having at least one angulated reflective wall, and a base wall under said support platform.

2. A portable cooking device as claimed in claim 1 wherein said wall assembly comprises an outside wall hinged at a bottom end inwardly of an outer edge of said other of said concave sections, side walls hinged to opposed vertical edges of said outside wall, said reflective wall being hinged to an edge of said other concave section opposite said edge to which said outside wall is hinged to, said side walls each having a securement means at a free vertical edge thereof engageable with a respective outer edge of said reflective wall to retain same at an angulated position sloping outwardly of said wall assembly whereby to reflect heat in the direction of an open top end of said wall assembly.

3. A portable cooking device as claimed in claim 2 wherein said reflective wall has a heat reflective coating on an inner surface thereof.

4. A portable cooking device as claimed in claim 2 wherein said side walls are foldable over an inner surface of said outside wall, said outside wall being hingeably displaceable to a horizontal position inside said other concave section with said reflective wall foldable over said outside wall and constituting a horizontal flat support top across said open end of said other of said concave sections.

5. A portable cooking device as claimed in claim 2 wherein a vertical slot is provided in one of said side walls for passage of a platform displaceable handle.

6. A portable cooking device as claimed in claim 5 wherein said platform displaceable handle is removably securable in an outer wall of one of said concave sections for carrying said cooking device.

7. A portable cooking device as claimed in claim 6 wherein said handle has a hand engageable portion, a frame engaging portion and a support section for engagement with one of said concave sections for carrying said cooking device.

8. A portable cooking device as claimed in claim 7 wherein said support section is engageable in a groove provided in a top outer edge of one of said concave sections.

9. A portable cooking device as claimed in claim 1 wherein said base wall under said support platform is an ash receiving heat reflective wall secured above a bottom wall of said other of said concave sections.

10. A portable cooking device as claimed in claim 1 wherein said base wall of said other of said concave sections is an ash receiving means.

11. A portable cooking device as claimed in claim 9 wherein said concave sections are provided with four opposed side walls, vent holes in at least some of said side walls of said other of said concave sections to provide ventilation around said ash receiving base wall and through said wall assembly.

12. A portable cooking device as claimed in claim 11 wherein said concave sections are formed of plastics material.

13. A portable cooking device as claimed in claim 11 wherein said concave sections are formed of a metallic material.

14. A portable cooking device as claimed in claim 1 wherein said concave sections define a base section and a cover section, said sections having opposed parallel side walls and a flat end wall, there being vents in at least two opposed side walls of said base section.

15. A portable cooking device as claimed in claim 14 wherein said side walls are inwardly inclined from outer edges of said cover and base sections to their respective flat end wall.

16. A portable cooking device as claimed in claim 14 wherein said cover and base sections are securable to one another through a hinge connection at opposed inner straight edges thereof to fold over one another in juxtaposition.

17. A portable cooking device as claimed in claim 16 wherein fastening means is provided adjacent outer edges of said cover and said base to lock them together in said juxtaposition.

18. A portable cooking device as claimed in claim 17 wherein said fastening means is a spring fastener secured adjacent said outer edge of said cover and having an engaging portion flexibly engageable in a lock opening adjacent said outer edge of said base.

19. A portable cooking device as claimed in claim 18 wherein said fastening means is also engageable with said heat transmitting support surface above said heat generating element.

20. A portable cooking device as claimed in claim 19 wherein said heat transmitting support frame is a rectangular wire grill hinged at one edge to said inner edge of said cover and securable at an opposed edge to said fastening means.

21. A portable cooking device as claimed in claim 20 wherein said heat generating element is a gas burner secured to a hinge plate, said wire grill being secured spaced from said gas burner a distance sufficient to permit captive storage of said support platform therebetween, and a storage compartment defined under said hinge plate having said gas burner.

22. A portable cooking device as claimed in claim 2 wherein opposed side walls of said wall assembly are each provided with a plurality of spaced support elements therein for supporting said combustible product support platform at a desired vertical position.

23. A portable cooking device as claimed in claim 22 wherein there is further provided a foodstuff support wire frame supported above said support platform and engageable by additional support elements.

24. A portable cooking device as claimed in claim 23 wherein all said support elements are hook engaging slotted protrusions stamped in said opposed side walls of said side wall assembly.

25. A portable cooking device as claimed in claim 24 wherein said combustible product support platform is a wire frame, said combustible product and foodstuff support wire frames each having hook ends for engagement in said slotted protrusions.

26. A portable cooking device as claimed in claim 1 wherein said heat generating element is a gas burner.

27. A portable cooking device comprising a housing having two concave sections each having an open end and securable to one another in juxtaposition with their open ends facing one another, one of said sections having a collapsible wall assembly secured thereto and positionable to an operable vertical position extending above said open end of said one concave section, a combustible product support platform securable internally of said wall assembly when in said operable vertical position to support a combustible product thereon, said wall assembly having at least one angulated reflective wall, a base wall under said support platform, wherein opposed side walls of said wall assembly are each provided with a plurality of spaced support elements therein for supporting said combustible product support platform at a desired vertical position.

28. A portable cooking device as claimed in claim 27 wherein a wall is hingeably connected adjacent a top edge of said one concave section to constitute a support surface.

29. A portable cooking device as claimed in claim 27 wherein said wall assembly comprises an outside wall hinged at a bottom end to an outer edge of said one of said concave sections, a side wall hinged to opposed vertical edges of said outside wall, said reflective wall being hinged to an edge of said one concave section opposite said edge to which said outside wall is hinged to, said side walls each having a securement means at a free vertical edge thereof engageable with a respective outer edge of said reflective wall to retain same at an angulated position sloping outwardly of said wall assembly whereby to reflect heat in the direction of an open top end of said wall assembly.

30. A portable cooking device as claimed in claim 29 wherein said side walls are foldable over an inner surface of said outside wall, said outside wall being hingeably displaceable to a horizontal position inside said one concave section with said reflective wall foldable over said outside wall and constituting a horizontal flat support top across said open end of said one of said concave sections.

31. A portable cooking device as claimed in claim 30 wherein said base wall under said support platform is an ash receiving heat reflective wall secured above a bottom wall of said one of said concave sections.

32. A portable cooking device as claimed in claim 30 wherein said concave sections are provided with four opposed side walls, vent holes in at least some of said side walls of said one of said concave sections to provide ventilation around said ash receiving base wall and through said wall assembly.

33. A portable cooking device as claimed in claim 32 wherein said concave sections define a base section and a cover section, said sections having opposed parallel side walls and a flat end wall, there being vents in at least two opposed side walls of said base section.

34. A portable cooking device as claimed in claim 33 wherein said cover and base sections are securable to one another through a hinge connection at opposed inner straight edges thereof to fold over one another in juxtaposition.

35. A portable cooking device as claimed in claim 34 wherein fastening means is provided adjacent outer edges of said cover and said base to lock them together in said juxtaposition.

36. A portable cooking device as claimed in claim 35 wherein said fastening means is a spring fastener secured adjacent said outer edge of said cover and having an engaging portion flexibly engageable in a lock opening adjacent said outer edge of said base.

37. A portable cooking device as claimed in claim 27 wherein there is further provided a foodstuff support wire frame supported above said support platform and engageable by additional support elements.

38. A portable cooking device as claimed in claim 37 wherein all said support elements are hook engaging slotted protrusions stamped in said opposed side walls of said side wall assembly.

39. A portable cooking device as claimed in claim 38 wherein said combustible product support platform is a wire frame, said combustible product and foodstuff support wire frames each having hook ends for engagement in said slotted protrusions.

* * * * *